United States Patent [19]

Brekke

[11] 4,438,758

[45] Mar. 27, 1984

[54] SOLAR HEATING UNIT AND HEAT TRANSFER APPARATUS

[76] Inventor: Carroll E. Brekke, 6130 Monterey Rd., #83, San Jose, Calif. 95138

[21] Appl. No.: 388,403

[22] Filed: Jun. 14, 1982

[51] Int. Cl.³ ............................................... F24J 3/02
[52] U.S. Cl. .................................... 126/419; 126/423; 126/428; 126/444; 165/170
[58] Field of Search .............. 126/433, 445, 428, 429, 126/444, 442, 449, 446, 419, 423; 165/170, 166

[56] References Cited

U.S. PATENT DOCUMENTS

| | | | |
|---|---|---|---|
| 1,826,344 | 10/1931 | Dalgliesh | 165/170 |
| 2,156,544 | 5/1939 | Raskin | 165/170 X |
| 3,007,680 | 11/1961 | Harris | 165/170 X |
| 3,782,553 | 1/1974 | Brekke . | |
| 4,002,200 | 1/1977 | Raskin | 165/170 X |
| 4,046,133 | 9/1977 | Cook | 126/429 |
| 4,067,314 | 1/1978 | Bollefer | 126/433 X |
| 4,076,024 | 2/1978 | Banet | 126/445 |
| 4,103,493 | 8/1978 | Schoenfelder | 126/435 X |
| 4,134,390 | 1/1979 | Rawal | 126/444 |
| 4,203,421 | 5/1980 | Bencic . | |
| 4,212,347 | 7/1980 | Eastman . | |
| 4,227,514 | 10/1980 | Spitzer . | |
| 4,270,521 | 6/1981 | Brekke . | |
| 4,301,863 | 11/1981 | Bizzaro | 165/166 |

Primary Examiner—Larry Jones
Attorney, Agent, or Firm—Fliesler, Dubb, Meyer & Lovejoy

[57] ABSTRACT

A heating unit (10) transfers energy via vaporized working fluid exclusively. The unit operates at sub-atmospheric pressure and a unique heat transfer apparatus (84) is provided to serve as an energy absorber panel (12) and/or a heat exchange unit (44). Since vaporized working fluid is utilized to transfer energy several hundred times the amount of energy can be transferred per unit weight of working fluid as compared to systems which transfer energy via liquid working fluid. Thus, a minimal amount of working fluid can be utilized. The heating unit (10) is constructed so as to prevent the delivery of working fluid to the interior cavity (18) of the energy absorber panel (12) in response to the working fluid within the cavity (18) reaching a selected level. Vapor is conducted from a location in the cavity (18) above that selected level to the heat exchange unit (44). The working fluid is selected to boil at a sub-atmospheric pressure within the cavity (18) at a temperature which falls within a range from about 27° C. to about 99.5° C.

14 Claims, 4 Drawing Figures

SOLAR HEATING UNIT AND HEAT TRANSFER APPARATUS

DESCRIPTION

1. Technical Field

This invention relates generally to an improved solar heating unit and to an improved heat transfer apparatus especially adapted for use with the improved solar heating unit.

2. Background Art

In prior art solar heating units, a solar heat absorber panel is generally placed upon the roof of a house. The solar panel absorbs radiant energy from the sun and transfers that energy to a liquid working fluid which flows through an interior cavity which is defined by the solar panel. Usually, the working fluid will have a boiling point of 100° C. or above at atmospheric pressure and the interior of the unit will generally be at atmospheric pressure or at a somewhat elevated pressure. As a result, it is necessary to construct the solar panel and any associated heat exchanger unit out of relatively strong and heavy duty materials to prevent pressure differential initiated bursting, thereby increasing their weight and cost.

One particularly serious problem with prior art solar energy absorber panels is that local stagnant hot spots often develop. This decreases efficiency since the transfer of heat is directly proportional to temperature differential and the stagnant hot spots lead to some relatively cool fuid being circulated as flow occurs away from the hot spots, carrying the cool fluid along. Relatively heavy inlet and outlet distribution manifolds are often used to limit the effects of the stagnant hot spots but these are costly and add significantly to the overall weight of the apparatus.

In the prior art solar heating units, the liquid working fluid is flowed, as a liquid, from the solar absorber panel to a heat exchanger where the working fluid is cooled, and a fluid supply isolated from the working fluid and external of the solar heating unit, per se, is heated to a desired temperature. For example, the external fluid can be in the water heating system of a home or business. In this manner, the hot water system of a home or business can be heated to as high as about 65° C. Generally, a pump or the like is utilized to force the working fluid to flow in a circular path between the solar heat absorber panel and the heat exchanger unit. Such a pump normally operates continuously and transfers the working fluid, in the form of a liquid, throughout the system. A considerable amount of energy is used to power the pump.

A solar heater unit utilizing a spacing material and being designed for sub-atmospheric pressure operation is disclosed in U.S. Pat. No. 4,203,421, issued May 20, 1980 to D. M. Bencic. While such a solar heater collector is useful for sub-atmospheric interior pressure systems, it does not provide sufficient free flow of the working fluid in every direction for truly efficient operation since the spacing material takes up a relatively high portion of the interior of the solar heat collector and is of a construction such that it inherently significantly interferes with free flow in all directions within the solar heat collector. This interference with free flow creates a potential problem with stagnant hot spots.

In U.S. Pat. No. 4,270,521, issued June 2, 1981 to C. E. Brekke, a solar heating system is disclosed wherein the working fluid is at sub-atmospheric pressure and boils at sub-atmospheric pressures and at temperatures which can be generated by the sun acting upon a solar heat absorber panel, e.g., from about 27° C. to about 99.5° C. if the working fluid is water or an ethylene glycol-water mixture. In that system, a pump is not utilized to move the fluid in a circular path between the solar panel and the heat exchange unit, but instead a vaporized portion of the working fluid serves to percolate the working fluid from a lower level in the system up to the solar heat absorber panel.

All of these known solar heating systems use the working fluid in liquid form to transfer heat and transport the heated working fluid, in liquid form, from the solar heat absorber panel to the heat exchange unit. None of the prior art systems make use of the high amount of energy available from the latent heat of vaporization of the working fluid to heat an outside fluid. Yet, the vaporization of a fluid requires the absorption of a great deal of energy and such energy can be recaptured as heat on its condensation. Latent heat of vaporization typically delivers several hundred times the heat contained in an equivalent weight of liquid.

The present invention is directed to overcoming one or more of the problems set forth above.

DISCLOSURE OF INVENTION

In one aspect of the present invention an improved heat transfer apparatus is disclosed which comprises first and second flexible wall members having respective upper, lower, first and second end portions, the wall members being generally parallel to and adjacent one another with the respective end portions being sealed together to form respective peripheries and to define an interior cavity. The wall members form the major heat exchange portion of the heat transfer apparatus. The heat transfer apparatus further includes a liquid inlet communicating with the interior cavity and a fluid outlet communicating with the interior cavity adjacent a higher junction of the upper peripheries. A structure is connected to and extends from a respective one of the wall members and contacts a respective other of the wall members. The structure is of a construction sufficient to provide such contacting over no more than about 15% of the surface area of the respective other wall member and to allow a fluid in the interior cavity to flow with substantially no impedence both from the lower periphery towards the upper periphery and from a selected one of the first and second end peripheries towards a respective other thereof. The first and second wall members, while being flexible, are of sufficient rigidity to not collapse together even when the interior cavity has a pressure of as low as about one-fifth atmosphere.

A heat transfer apparatus as just described has particular usefulness in solar heating systems which have a negative, i.e., below atmospheric, internal pressure. In such systems it is safe and desirable to have as little weight as possible. Yet, it must be possible for the working fluid to flow freely interiorly of the heat transfer apparatus. The heat transfer apparatus may serve as the solar heat absorber panel and/or as the heat exchange unit of the solar heating system.

In accordance with another aspect of the present invention an improved heating unit is provided. The unit comprises an energy absorber panel having an upper periphery and a lower periphery and defining an interior cavity. Fluid delivery means serve for delivering working fluid to the cavity. Means is provided for conducting a vapor formed in the cavity from the vaporization of the working fluid from a location in the cavity above the selected level to a heat exchanger unit. Means is also provided for preventing the delivering of liquid working fluid from the cavity to the heat exchanger unit. A fluid (liquid or gas) is provided in contact with an exterior of the heat exchanger unit, the fluid being in a quantity sufficient and the heat exchange unit being of a construction sufficient to normally condense the vapor back into a liquid state. Fluid conducting means are provided for conducting the condensed liquid working fluid to the fluid delivery means. The heating unit is sealed and has sub-atmospheric pressure within it and the working fluid is selected to boil at sub-atmospheric pressures and at temperatures which fall within a range from about 27° C. to about 99.5° C.

A solar heating unit as just set out transfers energy through vaporizing the working fluid in the radiant energy absorber panel and then transferring energy by condensing the fluid in the heat exchange unit. This allows the heat of vaporization of the liquid to be recaptured. Also, it allows a much lesser volume (weight) of working fluid to be transferred for the same amount of energy transfer. This lesser weight is typically several hundred times less than the weight-volume transfer of liquid required in an all liquid system. In accordance with a preferred embodiment of the present invention, power is provided for transferring the condensed working fluid upwardly to the radiant energy absorber panel by utilizing a pump which only operates intermittently along with an accumulator. In the most preferred embodiment of the invention both the radiant energy absorber panel and the heat exchange unit are of the novel nature as disclosed herein.

BEST MODE FOR CARRYING OUT THE INVENTION

Figure 1:
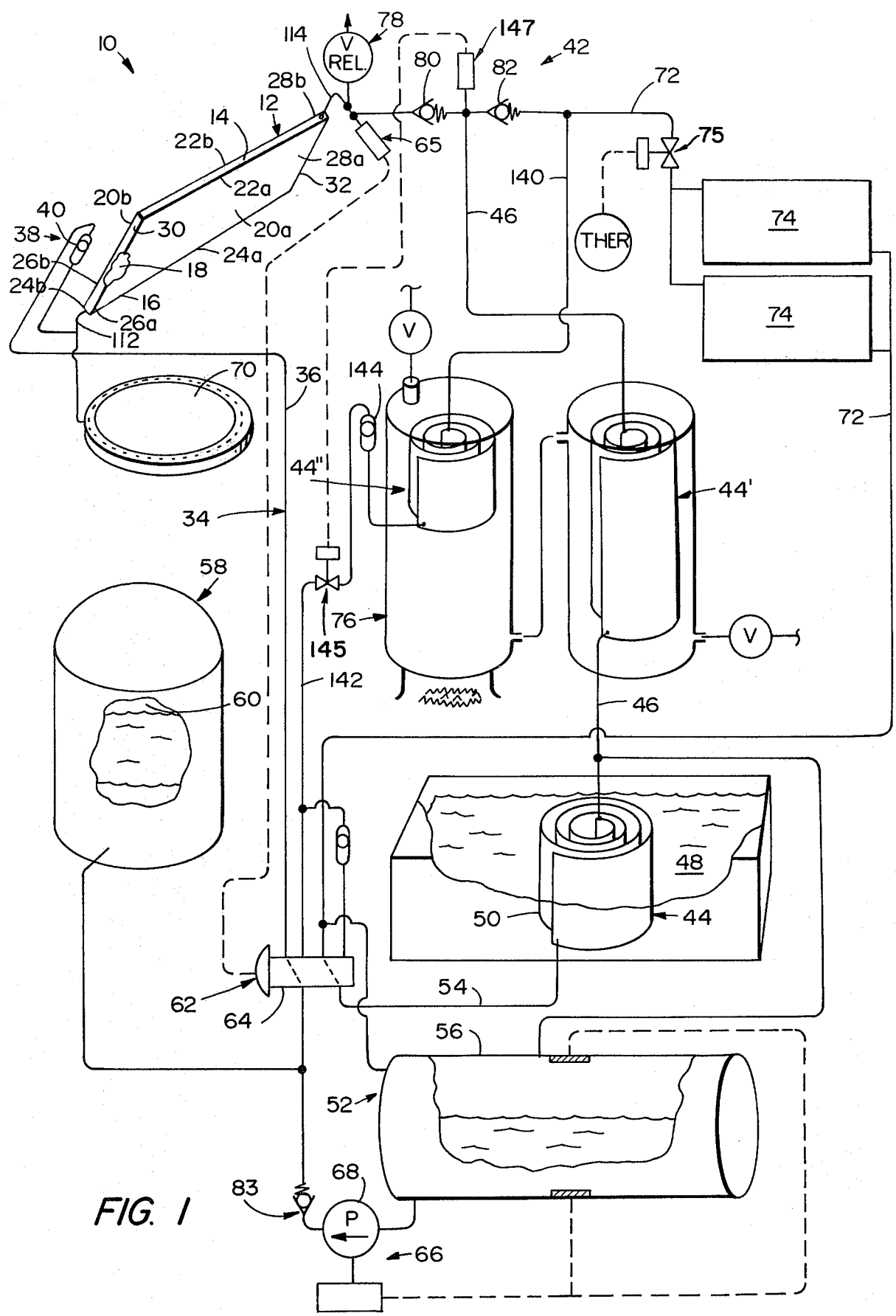
FIG. 1 illustrates a solar heating unit in accordance with an embodiment of the present invention.

Adverting to FIG. 1, a solar heating unit 10 is shown which includes a radiant energy absorber panel 12 having an upper periphery 14 and a lower periphery 16 and defining an interior cavity 18. The radiant energy absorber panel 12 includes a first wall member 20a and a second wall member 20b having a respective first and second member upper 22a, 22b, lower 24a, 24b, first end 26a, 26b and second end 28a, 28b end portions. The second wall member 20b is generally parallel to and adjacent the first wall member 20a and the respective end portions are sealed together to form the upper 14, the lower 16, a first end 30 and a second end 32 periphery. In this manner, the radiant energy absorber panel 12 defines the interior cavity 18.

Fluid delivery means 34 serves for delivering working fluid to the cavity 18. In the particular embodiment illustrated a conduit 36 delivers working fluid to the interior cavity 18 adjacent the juncture of the first end periphery 30 and the lower periphery 16.

Means 38 serve for preventing the delivering of working fluid to the cavity 18 in response to the working fluid reaching a selected level within the cavity 18. This also prevents flow of liquid working fluid downstream of the cavity 18. In the particular embodiment illustrated in FIG. 1 the delivery preventing means 38 comprises a float valve 40 located at a height substantially equal to the selected level within the cavity 18. When the liquid level within the cavity 18 is high enough, the float valve 40 shuts off flow through the conduit 36. The float valve 40 is constructed to have sufficient buoyancy or mechanical advantage to hold back the maximum pressure which may occur in the conduit 36.

Means 42 is provided for conducting a vapor formed in the cavity 18 from the working fluid from a location in the cavity 18 above the selected level to a heat exchange unit 44. In the particular embodiment illustrated the vapor conducting means 42 comprises a conduit 46. A fluid 48 is provided in contact with an exterior 50 of the heat exchange unit 44. The fluid 48 is in a quantity sufficient and the heat exchange unit 44 is of a construction sufficient to normally condense the vapor back into a liquid working fluid. Fluid conducting means 52 are provided for conducting the condensed working fluid from the heat exchange unit 44 to the fluid delivery means 34. In the embodiment illustrated the means 52 includes a conduit 54 and a storage tank 56.

The temperature differential, between the temperature of the fluid 48 and the temperature of the working fluid condensed in the heat exchange unit 44, dictates the absolute internal pressure within the solar heating unit 10. As the temperature differential decreases, for example as the temperature of the fluid 48 increases, the temperature of the working fluid being returned to the absorber panel 12 must also rise and the absolute pressure within the solar heating unit 10 must rise as condensation efficiency drops whereby the boiling point of the working fluid must rise. This creates a new and higher temperature differential at the heat exchange unit 44 and condensation efficiency accordingly rises. Thus, the solar heating unit 10, when constructed as shown in FIG. 1, includes means for continuously adjusting its internal pressure to maintain a sufficient temperature differential for sustaining efficient transfer of heat from the heat exchange unit 44 to the fluid 48.

The fluid delivery means 34 preferably comprises a tank 58 having an inner chamber 60 and means 62 for selectively connecting the tank in fluid flow communication with the radiant energy absorber panel 12. Such selective connecting means 62 preferably includes a multiconnection valve 64 controlled by a temperature or pressure sensor 65.

The apparatus preferably includes pressurizing means 66, in the embodiment illustrated a pump 68, for pressurizing the tank 58 to a pressure sufficiently above the sub-atmospheric pressure in the unit 10 to cause the working fluid in the tank 58 to flow into the radiant energy absorber panel 12. The pump 68 can be controlled to operate when the pressure differential in the storage tank 56 reaches a specific value.

The tank 58 may be made of a rigid construction whereby it may be desirable to have a bladder 70 which can expand to reduce the normal operating level of fluid within the radiant energy absorber panel 12 during overheat conditions when pressure in the system gets too high. This eliminates any possibility of rupturing of the system if the temperature of the working fluid exceeds the boiling point, at atmospheric pressure of the working fluid, for example, 100° C., if the working fluid is water. As an alternative, the tank 58 can be made of a collapsible material such as plastic or rubber, whereby atmospheric pressure acts against the outside of the tank 58 thus forcing it to collapse and providing impetus for forcing the liquid within the tank 58 upwardly through the conduit 36 and into the radiant energy absorber panel 12.

The energy contained by the working fluid vapor which exits the radiant energy absorber panel 12 via the conduit 46 may be partially used prior to its arrival at the main heat exchange unit 44. For example, the vapor can be passed via an alternative conduit 72 and via a vapor directing valve 75 through one or more decorative wall panels indicated generally at 74. Alternatively, or additionally, the vapor of the working fluid can be passed in contact with an additional heat exchange unit 44' wherein it can preheat incoming cold water before that water reaches a water heating unit 76.

Additional overheat protection is provided by a check valve 78. Appropriate backflow preventing valves 80, 82 and 83 are likewise provided.

Figure 2:
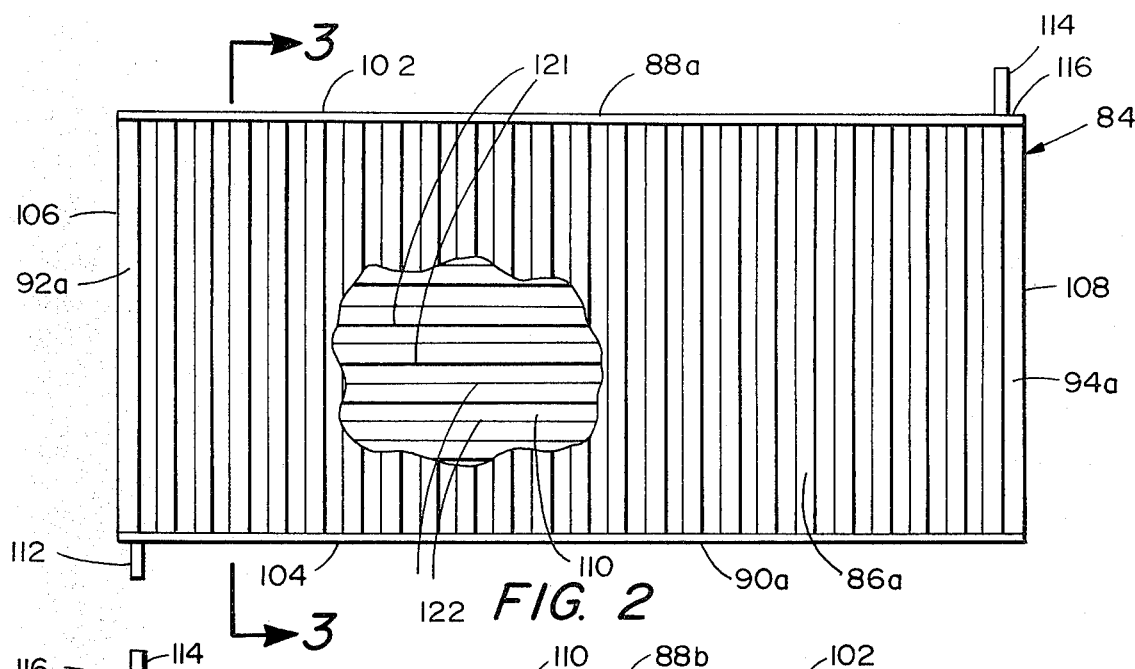
FIG. 2 illustrates in a side view, partially cut away, one embodiment of a heat transfer apparatus in accordance with an embodiment of the present invention.
Figure 4:
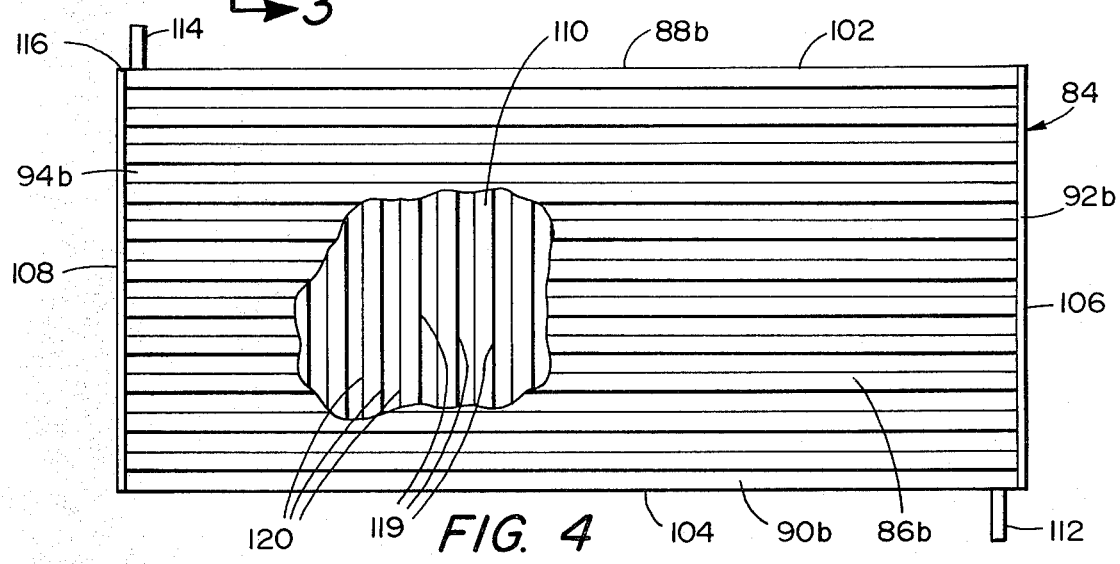
FIG. 4 is a side view, partially cut away and taken from an opposite side, of the embodiment illustrated in FIG. 2.
Figure 3:
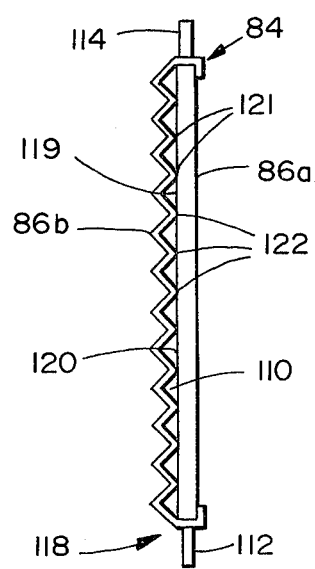
FIG. 3 is a view taken along the line III—III of FIG. 2.

Reference should now be made to FIGS. 2, 3 and 4. In FIGS. 2, 3 and 4 a heat exchange unit 84 is shown which can be used as one or both of the solar radiant heat energy absorber panel 12 and the heat exchange unit 44 of the embodiment illustrated in FIG. 1. The heat transfer apparatus 84 comprises flexible first and second wall members 86a and 86b having respective upper 88a, 88b, lower 90a, 90b, ; first end 92a, 92b and second end 94a, 94b end portions. The first and second wall members 86a and 86b are generally parallel to and adjacent one another and the respective end portions are generally connected together to form respective upper 102, lower 104, first end 106 and second end 108 peripheries and to define an interior cavity 110. The wall members 86a and 86b form the major heat exchange portions of the heat transfer apparatus 84. The heat transfer apparatus 84 further includes a liquid inlet 112 communicating with the interior cavity 110 and a vaporized fluid outlet 114 which communicates with the interior cavity 110, preferably adjacent a higher junction 116 of the upper 102 and second end 108 peripheries.

A structure 118, is connected to and extends from a respective one of the first and second wall members 86a and 86b and contacts a respective other of the first and second wall members 86a and 86b. In the particular embodiment illustrated the structure 118 includes the vertices 119 of a plurality of V-shaped ridges 120 extending from the first member 86a towards the second member 86b and the vertices 121 of a plurality of ridges 122 extending from the second member 86b towards the first member 86a, with the ridges 120 and 122 being at a non-zero angle with respect to each other whereby they contact each other over a very small surface area (the points of contact of the ridges 120 and 122), well less than 15% of the surface area of the respective first 86a and second 86b members, to provide very significant gaps for flow of liquid working fluid in the liquid state as well as in the vapor state from the liquid inlet 112 to the vaporized fluid outlet 114. Thus, the structure 118 is of a construction sufficient to provide contacting over only a small portion of the surface area of the first and second wall members 86a and 86b, generally no more than about 15% of that surface area, and also of a construction sufficient to allow a working fluid in the interior cavity 110 to flow with substantially no impedence both from the lower periphery 104 towards the upper periphery 102 and from the first end periphery 106 towards the second end periphery 108. Further, the first and second wall members 86a and 86b are of sufficient rigidity to not collapse together when the interior cavity 110 has a significantly reduced pressure therein, for example only about one-fifth atmosphere. Thus, adequate flow of liquid working fluid is always assured. The heat exchange unit 84 generally includes only a small amount of working fluid in view of its construction, thus minimizing overall weight. It can be rolled up, if desired, to provide a large surface area for heat exchange as in the heat exchanger 44.

The solar heating unit 10 of the present invention has an advantage in that nighttime space heating can be provided from heat which is stored in the liquid 48. At night, warm vapor in the heat exchanger unit 44 can flow upwardly via the conduit 46 and past the check valve 82 and into the decorative wall panel 74 wherein it will condense and be returned to the storage tank 56. When necessary, the water heating unit 76 is automatically fired up for night time space heating whereby it will heat up yet an additional heat exchange unit 44", thus causing heated working fluid vapor to flow upwardly through a conduit 140 and thence to the decorative wall panels 74 wherein condensation occurs and the thereby condensed working fluid is returned via the conduit 72 to the storage tank 56. In this situation liquid working fluid from the tank 58 can be flowed via a conduit 142 and through a float valve 144 to the interior of the heat exchange unit 44" which is constructed to operate just as does the radiant energy absorber panel 12, with the float valve 144 corresponding to the float valve 40, etc. A valve 145 opens in response to a sensor 147 sensing that the temperature and/or pressure of the vapor in conduit 46 is insufficient to adequately supply heat to the wall panel 74. Thus, a building may be heated using an existing hot water heating unit, even without any solar energy input.

INDUSTRIAL APPLICABILITY

A solar heating unit 10 in accordance with the present invention is useful for heating water for home or business use, or for any other desired purpose. A heat transfer apparatus 84 in accordance with the present invention is useful with a solar heating unit 10 as a solar absorber panel 12 or as a heat exchange unit 44,44' or 44". The pump 68 need be used only very infrequently to fill up the tank 58 with working fluid. This assures a minimum use of energy. The heat of vaporization of the working fluid is utilized as the energy transfer or heat transfer medium whereby a relatively large amount of energy can be transferred while only a small weight of working fluid is circulated. Thus, the total amount of liquid circulated is minimized.

Other aspects, objectives, and advantages of this invention can be obtained from a study of the drawings, the disclosure and the appended claims.

I claim:
1. A heating unit (10), comprising:
   an energy absorber panel (12) having an upper periphery (14) and a lower periphery (16) and defining an interior cavity (18);
   fluid delivery means (34) for delivering working fluid to the cavity (18);

a heat exchange unit (44);

means (38) for preventing the delivering of working fluid to the cavity (18) in response to the working fluid within the cavity (18) reaching a selected level;

conducting means (42) for conducting a vapor formed in the cavity (18) due to vaporizing of the working fluid from a location in the cavity (18) above the selected level to the heat exchange unit (44);

a fluid (48) in contact with an exterior (50) of the heat exchange unit (44), the fluid (48) being in a quantity sufficient and the heat exchange unit (44) being of a construction sufficient to normally condense the vapor into the liquid working fluid;

fluid conducting means (52) for conducting the condensed working fluid from the heat exchange unit (44) to the fluid delivery means (34), the unit (10) being sealed and having sub-atmospheric pressure therein, the working fluid being selected to boil at said sub-atmospheric pressure at a temperature in a range from about 27° C. to about 99.5° C.;

a space heating unit (74);

vapor directing means (75) for directing vapor formed from said working fluid to said space heating unit (74) in response to ambient temperature adjacent said space heating unit (74) being below a selected value;

means (72) for conducting fluid condensed from said vapor in said space heating unit (74) to said fluid delivery conduit (34);

an auxiliary heat exchange unit (44") having an auxiliary interior cavity;

an auxiliary fluid delivery conduit (142) for delivering working fluid to said auxiliary cavity;

an auxiliary valve (144) in the auxiliary fluid delivery conduit (142), said auxiliary valve (144) being of a construction sufficient for preventing the delivery of working fluid to the auxiliary cavity in response to the working fluid within the auxiliary cavity reaching an auxiliary selected level;

auxiliary conducting means (140) for conducting vapor formed in the auxiliary cavity due to vaporization of the working fluid from a location in the auxiliary cavity above the auxiliary selected level to the vapor directing means (valve in 72);

means (76) for heating the auxiliary heat exchange unit (44") sufficiently for vaporizing the working fluid within the auxiliary cavity;

connecting means (62) for connecting the fluid conducting means (52) with the energy absorber panel (12); and sensor means (65) for sensing a condition within the cavity (18) and for controlling the connecting means (62) to connect the fluid conducting means (52) with the energy absorber panel (12) in response to said condition indicating vaporization of working fluid is occurring in said cavity (18) and for controlling the connecting means (62) to connect the fluid conducting means (52) with the auxiliary heat exchange unit (44") in response to said condition indicating non-vaporization of working fluid is occurring in said cavity (18).

2. A heating unit (10), comprising:

an energy absorber panel (12) having an upper periphery (14) and a lower periphery (16) and defining an interior cavity (18), said panel 12 comprising:

a flexible first wall member (86a) having first member upper (88a), lower (90a), first end (92a), and second end (94a) portions (88a, 90a, 92a, 94a), a second wall member (86b) having second member upper (88b), lower (90b), first end (92b) and second end (94b) portions (88b, 90b, 92b, 94b), said second wall member (86b) being generally parallel to and adjacent to said first wall member (86a), said respective first (86a) and second (86b) member upper (88a, 88b), lower (90a, 90b), first end (92a, 92b) and second end (94a, 94b) portions (88a, 88b, 90a, 90b, 92a, 92b, 94a, 94b) being sealed together to form upper (102), lower (104), first end (106), and second end (108) peripheries (102, 104, 106, 108) and to define an interior cavity (110) and said first (86a) and second (86b) wall members (86a, 86b) forming the major heat exchange portions of said panel (12), said panel (12) further including a liquid inlet (112) communicating with said interior cavity (110) and a vaporized fluid outlet (114) communicating with said interior cavity (110) adjacent said upper periphery (14), a structure (118) extending from a respective one (86a or 86b) of said first (86a) and second (86b) wall members (86a, 86b) and contacting a respective other (86a or 86b) thereof, said structure (118) being of a construction sufficient to provide such contacting over no more than about 15% of the surface area of said respective other (86a or 86b) of said first (86a) and second (86b) wall members (86a, 86b) and to allow a fluid in said interior cavity (110) to flow with substantially no impedance both from said lower periphery (102) towards said upper periphery (104) and from said first end periphery (106) towards said second end periphery (108), said first (86a) and second (86b) wall members (86a, 86b) being of sufficient rigidity to not collapse together when said interior cavity (110) has a pressure of as little as about one-fifth atmosphere;

fluid delivery means (34) for delivering working fluid to said cavity (18);

a heat exchange unit (44);

means (38) for preventing the delivering of working fluid to the cavity (18) in response to the working fluid within the cavity (18) reaching a selected level;

means (42) for conducting a vapor formed in the cavity (18) due to the vaporization of the working fluid from a location in the cavity (18) above the selected level to the heat exchange unit (44);

a fluid (48) in contact with an exterior (50) of the heat exchange unit (44), the fluid (48) being in a quantity sufficient and the heat exchange unit (44) being of a construction sufficient to normally condense the vapor into the liquid working fluid; and fluid conducting means (52) for conducting the condensed working fluid from the heat exchange unit (44) to the fluid delivering means (34), the unit (10) being sealed and having sub-atmospheric pressure therein, the working fluid being selected to boil at said sub-atmospheric pressure at a temperature in the range of from about 27° C. to about 99.5° C.

3. A heating unit (10) as set forth in claim 1 or claim 2, wherein said heat exchanger unit (44) comprises:

a flexible first wall member (86a) having first member upper (88a), lower (90a), first end (92a), and second end (94a) portions (88a, 90a, 92a, 94a), a second wall member (86b) having second member upper (88b), lower (90b), first end (92b) and second end (94b) portions (88b, 90b, 92b, 94b), said second wall member (86b) being generally parallel to and adjacent to said first wall member (86a), said respective first (86a) and second (86b) member upper (88a, 88b), lower (90a, 90b), first end (92a, 92b) and second end (94a, 94b) portions (88a, 88b, 90a, 90b, 92a, 92b, 94a, 94b) being sealed together to form upper (102), lower (104), first end (106), and second end (108) peripheries (102, 104, 106, 108) and to define an interior cavity (110) and said first (86a) and second (86b) wall members (86a, 86b) forming the major heat exchange portions of said heat transfer unit (44), said heat transfer unit (44) further including a liquid inlet (112) communicating with said interior cavity (110) and a vaporized fluid outlet (114) communicating with said interior cavity (110) adjacent said upper periphery (102), a structure (118) extending from a respective one (86a or 86b) of said first (86a) and second (86b) wall members (86a, 86b) and contacting a respective other (86a or 86b) thereof, said structure (118) being of a construction sufficient to provide such contacting over no more than about 15% of the surface area of said respective other (86a or 86b) of said first (86a) and second (86b) wall members (86a, 86b) and to allow a fluid in said interior cavity (110) to flow with substantially no impedence both from said lower periphery (104) towards said upper periphery (102) and from said first end periphery (106) towards said second end periphery (108), said first (86a) and second (86b) wall members (86a, 86b) being of sufficient rigidity to not collapse together when said interior cavity (110) has a pressure of as little as about one-fifth atmosphere.

4. A heating unit (10) as set forth in claim 1, wherein said fluid delivery means (34) comprises a tank (58) having an inner chamber (60) and means (62) for selectively connecting said tank (58) in fluid flow communication with said panel (12); and further including:
pressurizing means (66) for pressurizing said tank (58) to a pressure sufficiently above the sub-atmospheric pressure in said unit (10) to cause said working fluid in said tank (58) to flow into said panel (12).

5. A heating unit (10) as set forth in claim 4, wherein said pressurizing means (66) comprises a pump (68).

6. A heating unit (10) as set forth in claim 5, wherein said tank (58) is collapsible.

7. A heating unit (10) as set forth in claim 5, further including:
means (70) for reducing the quantity of said working fluid within said panel (12) in response to the pressure in said panel (12) reaching atmospheric pressure.

8. A heating unit (10) as set forth in claim 1, wherein said unit (10) is a solar heating unit (10) and said panel (12) is a radiant energy absorber panel (12).

9. A heating unit (10) as set forth in claim 1, wherein said unit (10) is a space heating unit (10), said heat exchanger unit (44) is a wall panel (74) and said energy absorber panel (12) is a heat exchange unit (44").

10. A heating unit (10) as set forth in claim 1, further including:
an additional heat exchange unit (44') wherein said conducting means (42) includes a conduit (46), a first check valve (80) adapted to receive and pass vapor formed in said cavity (18) to said conduit (46), a second check valve (82) adapted to receive and pass vapor from said conduit (46) to said vapor directing means (75), said conduit (46) being in flow communication with said additional heat exchange unit (44'), said additional heat exchange unit (44') being in flow communication with said heat exchange unit (44); and
fluid directing means (145) for directing fluid to said auxiliary heat exchange unit (44") in response to a condition in said conduit (46) indicative of the temperature therein being below a value sufficient to adequately supply heat to said space heating unit (74).

11. A heat transfer apparatus (84) which comprises a flexible first wall member (86a) having first member upper (88a), lower (90a), first end (92a), and second end (94a) portions (88a, 90a, 92a, 94a) a second wall member (86b) having second member upper (88b), lower (90b), first end (92b) and second end (94b) portions (99b, 90b, 92b, 94b), said second wall member (86b) being generally parallel to and adjacent to said first wall member (86a), said respective first (86a) and second (86b) member upper (88a, 88b), lower (90a, 90b), first end (92a, 92b) and second end (94a, 94b) portions (88a, 88b, 90a, 90b, 92a, 92b, 94a, 94b) being sealed together to form upper (102), lower (104), first end (106), and second end (108) peripheries (102, 104, 106, 108) and to define an interior cavity (110) and said first (86a) and second (86b) wall members (86a, 86b) forming the major heat exchange portions of said heat transfer apparatus (84), said heat transfer apparatus (84) further including a liquid inlet (112) communicating with said interior cavity (110) and a vaporized fluid outlet (114) communicating with said interior cavity (110) adjacent said upper periphery (102), a structure (118) extending from a respective one (86a or 86b) of said first (86a) and second (86b) wall members (86a, 86b) and contacting a respective other (86a or 86b) thereof, said structure (118) being of a construction sufficient to provide such contacting over no more than about 15% of the surface area of said respective other (86a or 86b) of said first (86a) and second (86b) wall members (86a, 86b) and to allow a fluid in said interior cavity (110) to flow with substantially no impedence both from said lower periphery (104) towards said upper periphery (102) and from said first end periphery (106) towards said second end periphery (108), said first (86a) and second (86b) wall members (86a, 86b) being of sufficient rigidity to not collapse together when said interior cavity (110) has a pressure of as little as about one-fifth atmosphere.

12. A heat transfer apparatus (84) as set forth in claim 11, wherein said structure (118) comprises a plurality of ridges (120) defining a first plurality of vertices (119) extending from said first wall member (86a) toward said second wall member (86b) and a second plurality of ridges (122) defining a second plurality of vertices (121) extending from said second wall member (86b) toward said first wall member (86a), said first (120) and second (122) pluralities of ridges (120, 122) extending at angles to one another whereby said first plurality of vertices (119) and said second plurality of vertices (121) contact one another at a plurality of points.

13. A heating unit (10), comprising:
an energy absorber panel (12) having an upper periphery (14) and a lower periphery (16) and defining an interior cavity (18);
fluid delivery means (34) for delivering working fluid to the cavity (18);

a heat exchange unit 44;

conducting means (42) for conducting a vapor formed in the cavity (18) due to vaporizing of the working fluid from a location in the cavity (18) above the selected level to the heat exchange unit (44);

means (38) for preventing flow of liquid working fluid from the cavity (18) to the heat exchange unit (44);

a fluid (48) in contact with an exterior (50) of the heat exchange unit (44), the fluid (48) being in a quantity sufficient and the heat exchange unit (44) being of a construction sufficient to normally condense the vapor into the liquid working fluid;

fluid conducting means (52) for conducting the condensed working fluid from the heat exchange unit (44) to the fluid delivery means (34), the unit (10) being sealed and having sub-atmospheric pressure therein, the working fluid being selected to boil at said sub-atmospheric pressure at a temperature in a range from about 27° C. to about 99.5° C.;

a space heating unit (74);

vapor directing means (75) for directing vapor formed from the working fluid to the space heating unit (74) in response to ambient temperature adjacent the space heating unit (74) being below a selected value;

means (72) for conducting fluid condensed from said vapor in said space heating unit (74) to said fluid delivery conduit (34);

an auxiliary heat exchange unit (44") having an auxiliary interior cavity;

an auxiliary fluid delivery conduit (142) for delivering working fluid to said auxiliary cavity;

an auxiliary valve (144) in the auxiliary fluid delivery conduit (142), the additional valve (144) being of a construction sufficient for preventing the delivering of working fluid to the auxiliary cavity in response to the working fluid within the auxiliary cavity reaching an auxiliary selected level;

auxiliary conducting means (140) for conducting a vapor formed in said auxiliary cavity due to the vaporization of the working fluid from a location in the auxiliary cavity above the auxiliary selected level to the space heating unit (74);

means (76) for heating said auxiliary heat exchange unit (44") sufficiently for vaporizing said working fluid within said auxiliary cavity;

connecting means (62) for connecting the fluid conducting means (52) with the energy absorber panel (12); and sensor means (65) for sensing a condition within the cavity (18) and for controlling the connecting means (62) to connect the fluid conducting means (52) with the energy absorber panel (12) in response to said condition indicating vaporization of working fluid is occurring in said cavity (18) and for controlling the connecting means (62) to connect the fluid conducting means (52) with the auxiliary heat exchange unit (44") in response to said condition indicating non-vaporization of working fluid occurring in said cavity (18).

14. A heating unit (10) as set forth in claim 13, further including:

an additional heat exchange unit (44') wherein said conducting means (42) includes a conduit (46), a first check valve (80) adapted to receive and pass vapor formed in said cavity (18) to said conduit (46), a second check valve (82) adapted to receive and pass vapor from said conduit (46) to said vapor directing means (76), said conduit (46) being in flow communication with said additional heat exchange unit (44'), said additional heat exchange unit (44') being in flow communication with said heat exchange unit (44); and fluid directing means (145) for directing fluid to said auxiliary heat exchange unit (44") in response to a condition in said conduit (46) indicative of the temperature therein being below a value sufficient to adequately supply heat to said space heating unit (74).

* * * * *